April 11, 1967      H. J. RIBLET      3,314,017

BALANCED PHASE TYPE FREQUENCY DISCRIMINATORS

Filed June 1, 1964      3 Sheets-Sheet 1

INVENTOR.
HENRY J. RIBLET
BY
Weingarten, Ozenbuch & Lahive
ATTORNEYS

April 11, 1967 H. J. RIBLET 3,314,017
BALANCED PHASE TYPE FREQUENCY DISCRIMINATORS
Filed June 1, 1964 3 Sheets-Sheet 3
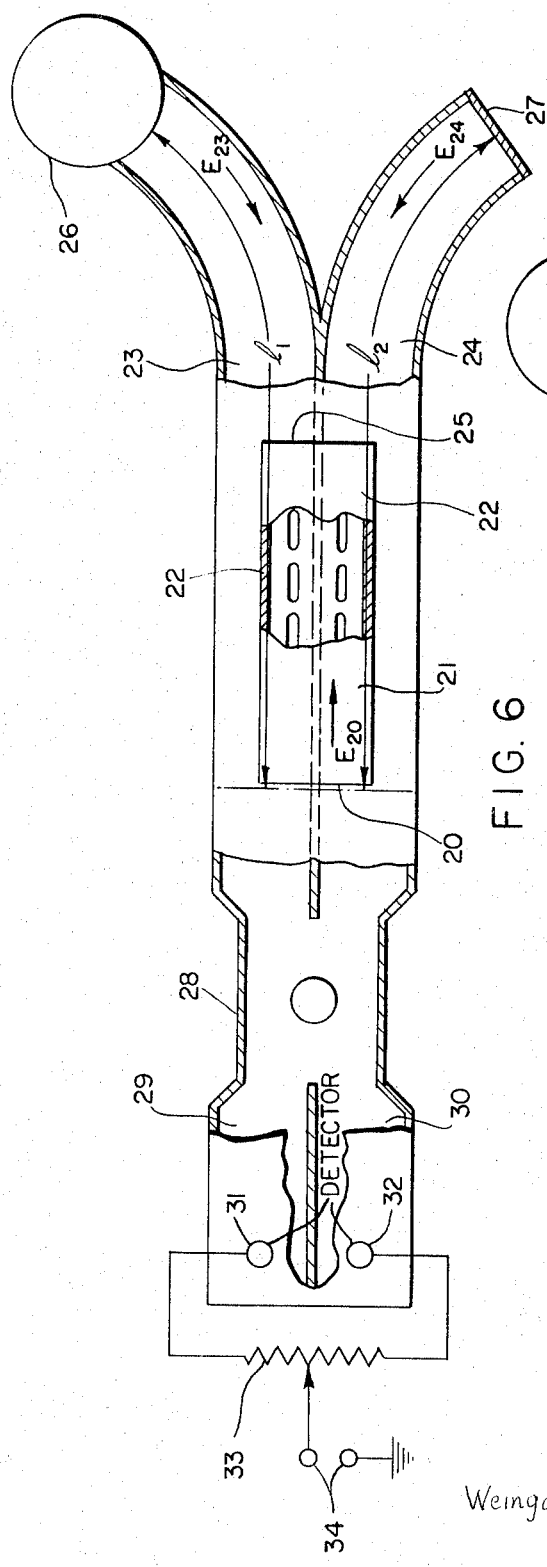
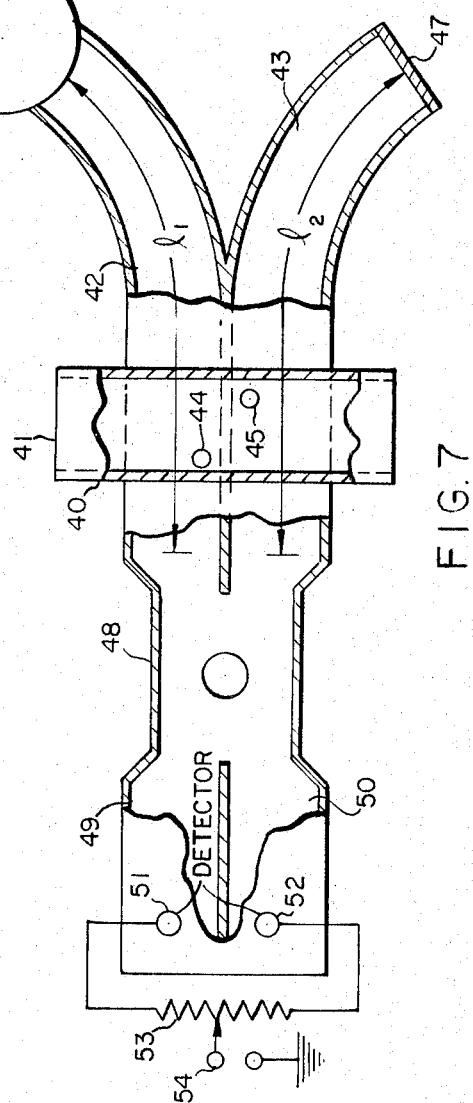
INVENTOR.
HENRY J. RIBLET
BY
Weingarten, Orenbuch, & Lahive
ATTORNEYS

United States Patent Office 3,314,017
Patented Apr. 11, 1967

3,314,017
BALANCED PHASE TYPE FREQUENCY
DISCRIMINATORS
Henry J. Riblet, 35 Edmunds Road,
Wellesley, Mass. 02181
Filed June 1, 1964, Ser. No. 371,319
4 Claims. (Cl. 329—116)

This invention relates in general to frequency discriminators and more particularly pertains to frequency discriminators for use at those radio frequencies where waveguide, coaxial, or strip transmission lines are commonly employed.

Frequency discriminators of the balanced phase detector and staggered tuned types are well known in the electronic art. The present invention pertains to the balanced phase detector type of discriminator. In general, this type of discriminator requires the incident signal, whose frequency deviation is to be measured, to be divided between two radio frequency transmission paths. In the transmission paths, the two signals are shifted in phase relative to each other, the magnitude of the relative phase shift being a function of the signal frequency. By employing a detector in each signal transmission path and comparing the outputs of the detectors, an output signal dependent upon the relative phase shift is obtained.

The invention resides in apparatus having two transmission channels that are terminated by wave energy reflectors in a manner such that the phase of the wave energy reflected in one channel is dependent upon the frequency of the incident signal whereas the phase of the wave energy reflected in the other channel is independent of the frequency of the incident signal. A cavity resonator is employed in the invention as the frequency dependent reflector terminating one transmission channel and the frequency independent reflector is obtained by terminating the other transmission channel by a short circuit. An incident signal vibrating at the resonant frequency of the cavity is reflected from the cavity in phase as though from a short or open circuit. At any other frequency, the phase of the signal reflected from the cavity is shifted in one direction for frequencies above resonance and in the opposite direction for frequencies below resonance.

The invention, both as to its construction and mode of operation, can be more fully understood from a study of the following exposition which is intended to be considered in conjunction with the accompanying drawings in which:

FIG. 6 illustrates the arrangement of another embodiment of the invention; and

FIG. 7 depicts the scheme of a further embodiment of the invention.

Figure 1:
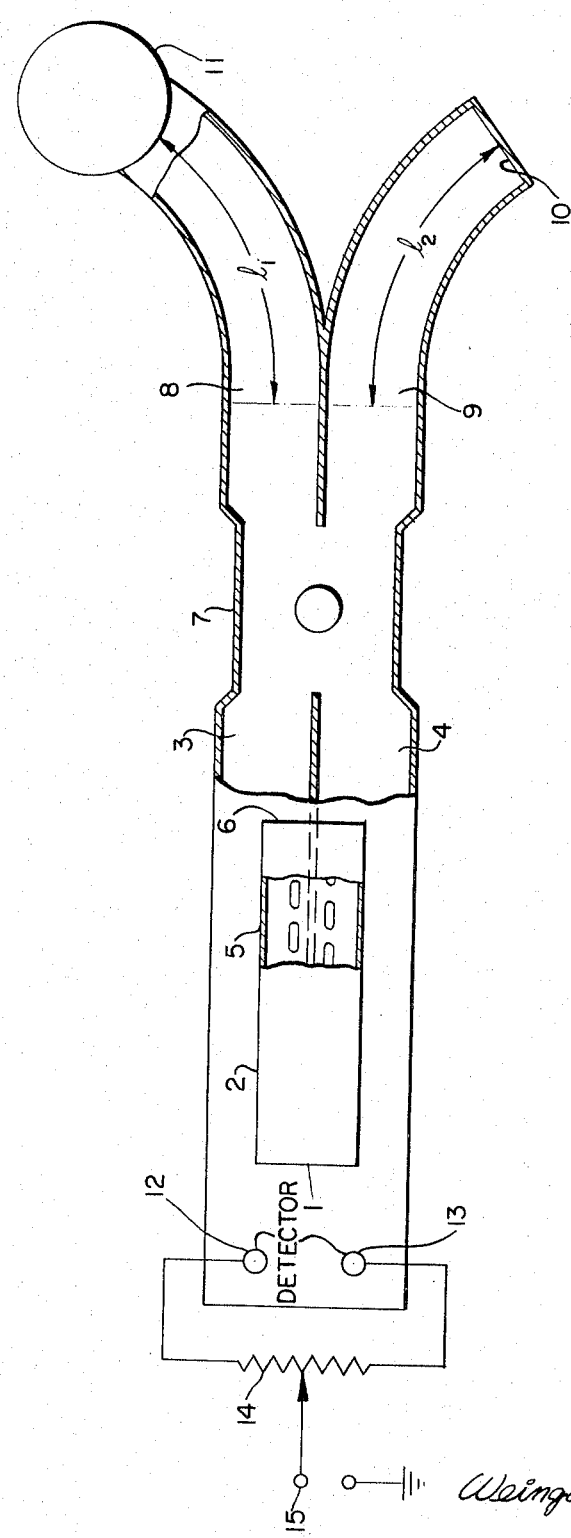
FIG. 1 depicts the scheme of an embodiment of the invention.

Referring now to FIG. 1, there is shown an arrangement illustrating the scheme of the invention. The embodiment of FIG. 1 is intended for use at those frequencies where waveguide is commonly employed for wave transmission. The incident signal, whose deviation from a reference frequency is to be measured by the discriminator, is applied at the input port 1 of a rectangular waveguide 2. A portion of the wave energy propagating in waveguide 2 enters transmission channels 3 and 4 by means of a dual directional coupler 5. Transmission channels 3 and 4 are formed of hollow rectangular waveguides and each transmission channel is connected to a different input arm of a 90° phase shift 3 db coupler 7. Coupler 7 is a quadrature hybrid device that divides an incoming signal into two parts and shifts the phase of one part 90° relative to the other. Preferably, coupler 7 is a device of the type termed a "short slot hybrid junction" which is described in my U.S. Patents Ser. No. 2,739,287 and Ser. No. 2,739,288. It is a characteristic of the short slot hybrid coupler, as it is of any quadrature hybrid, that energy applied to one of its input arms is equally divided between the two output arms with substantially complete isolation of the opposite input arm.

As indicated in FIG. 1, transmission channels 3 and 4 are preferably constituted by a single rectangular pipe having an internal partition forming a common sidewall dividing the pipe into two waveguides. The output arms of the quadrature 3 db coupler 7 are connected to transmission channels 8 and 9. The waveguide constituting transmission channel 9 is terminated by a metal plate 10 which acts as a short circuit. Transmission channel 8 is coupled to and terminated by a cavity resonator 11. In channel 9, the path length $l_2$ of wave energy reflected from the short circuit is equal to the path length $l_1$ in channel 8 of wave energy reflected from the cavity resonator where the frequency of the wave energy is at the resonant frequency of the cavity resonator. A pair of detectors 12 and 13 are disposed, as shown, in transmissions channels 3 and 4 respectively. Detectors 12 and 13 are preferably crystal diodes but other devices capable of detecting signals at the frequencies permitted by the transmission channels may be used. The D.C. output signals of detectors 12 and 13 are applied to a potentiometer 14 having an adjustable tap connected to output terminal 15. The D.C. output signals of the detectors are effectively subtracted, one from the other, by potentiometer 14.

OPERATION

A signal applied at input port 1 propagates along waveguide 2 and enters dual directional coupler 5. A portion of the input signal wave energy enters transmission channel 3, another portion of the input signal wave energy couples into transmission channel 4, and the remainder of the input signal wave energy proceeds through the directional coupler 5 to the output port 6 of waveguide 2. The signals coupled into transmission channels 3 and 4 by the directional coupler are of the same magnitude and phase and those signals proceed along the transmission channels toward quadrature hybrid coupler 7. In the quadrature hybrid coupler, the signal from transmission channel 3 divides into two equal parts, one part entering transmission channel 8 and the other part entering transmission channel 9 with a 90° difference in phase relative to the first part. Similarly, the signal from transmission channel 4 entering the quadrature hybrid coupler is divided into two equal parts, one part entering transmission channel 9 and the other part entering transmission channel 8 with a 90° difference in phase relative to the first part. Thus, the combined signal entering channel 8 is equal in amplitude and phase to the combined signal entering channel 9. The signal in channel 8 that is incident on the resonant cavity, therefore, is equal in amplitude and is of the same phase as the signal in channel 9 that is incident upon the short circuit 10.

Figure 2:
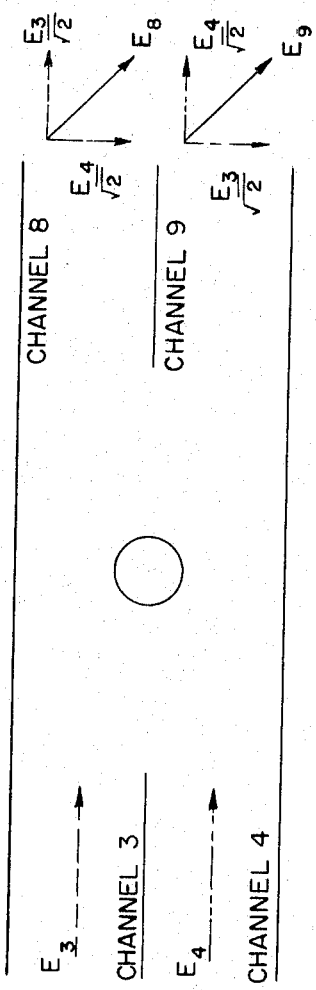
FIG. 2 is a vector diagram showing how the incoming signals are affected by passing through the phase-shift coupler.

The vector diagram of FIG. 2 indicates the phase and amplitude of the signal entering and leaving the quadrature hybrid. The signal $E_3$, entering from channel 3, is equal in magnitude and is of the same phase as the signal $E_4$ entering from channel 4. Half of the energy in signal $E_3$ enters channel 8 and the other half enters channel 9. However, the wave voltage $E_3/\sqrt{2}$ entering channel 9 differs in phase by 90° from the wave voltage $E_3/\sqrt{2}$ entering channel 8. Similarly the wave voltage $E_4/\sqrt{2}$ entering channel 8 differs in phase by 90° from the wave voltage $E_4/\sqrt{2}$ entering channel 9. The vector resultants $E_8$ and $E_9$ of the wave energy components entering channels 8 and 9 are equal in length, indicating the combined signals in channels 8 and 9 are equal in amplitude.

Transmission channel 8 is coupled to cavity resonator 11 so that the resonator is a one-entry device. The impedance of a one-entry resonator is described in detail in Principles of Radar, 3rd Edition, by Reintjes and Coate, published by McGraw-Hill, at pages 639 to 645. Assuming the input signal applied at port 1 is at the resonant frequency of the cavity resonator, the signal $E_8$ incident on the cavity resonator is reflected in phase as from a short circuit. Where the frequency of the incident signal $E_8$ is above or below resonance, the phase of the reflected signal is affected by the reactance of the resonant cavity, causing the phase of the reflected signal to be shifted in one direction at frequencies above resonance and shifted in the other direction for frequencies below resonance.

The signal $E_9$, in channel 9, incident on the short circuit, is reflected from that termination. The phase of the reflected signal is not, however, affected by the frequency of the incident signal.

At resonance, the signal $E_8$ incident on the resonator, is reflected in phase with the signal simultaneously reflected from the short circuit in channel 9. Because of losses in the actual cavity resonator the amplitude of the signal reflected by the resonator is much lower in amplitude than the reflected signal in channel 9. As the path length $l_1$ of channel 8 is equal to the path length $l_2$ of channel 9, the reflected signals in those channels are in phase when the signals enter quadrature hybrid coupler 7.

Figure 3:
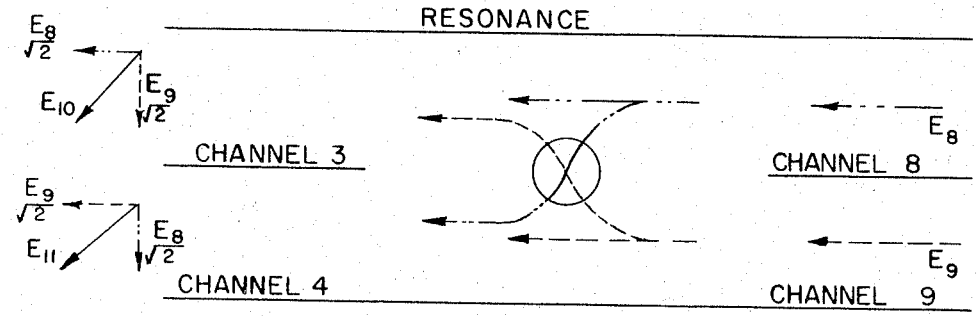
FIG. 3 is a vector diagram indicating the magnitudes and phases of the reflected signals when the input signal is at the resonance.

FIG. 3 is a vector diagram showing the reflected signals entering the quadrature hybrid and the resultant signals emerging from the hybrid into channels 3 and 4. As the input signal is at the resonant frequency of the cavity resonator, reflected voltage $E_8$ is in phase with reflected voltage $E_9$, although of lesser amplitude. The power in signal $E_8$ is split into two equal parts in the hybrid, a voltage $E_8/\sqrt{2}$ enters channel 3 and an equal voltage enters channel 4 shifted by 90° in phase relative to that in channel 3. Similarly, the power in reflected signal $E_9$ is split into two equal parts, a voltage $E_9/\sqrt{2}$ enters channel 4 and an equal voltage enters channel 3 with a 90° phase difference relative to the first half. The resultant signals $E_{10}$ and $E_{11}$ emerging into channels 3 and 4 are equal and proceed through those channels to detectors. Because resultant signals $E_{10}$ and $E_{11}$ are equal, the output of detector 12 equals the output of detector 13 and a null indication from potentiometer 14 is obtained at terminals 15.

Figure 4:
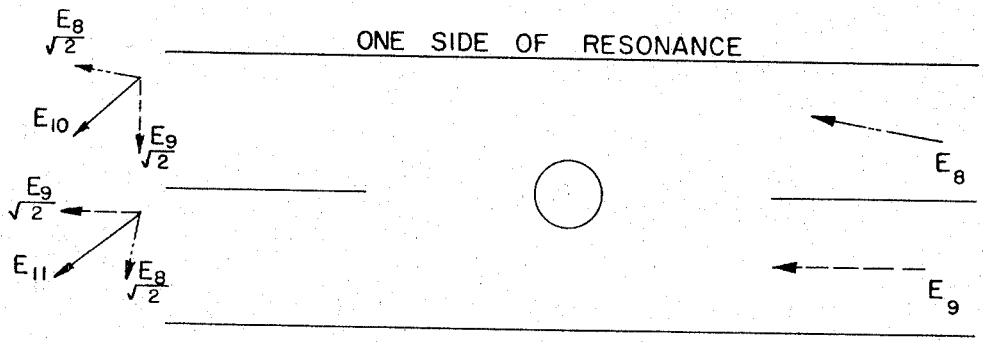
FIG. 4 is a vector diagram depicting the magnitude and phases of the reflected signals when the input signal is at one side of resonance.

FIG. 4 illustrates, vectorially, the changes in the resultant signals $E_{10}$ and $E_{11}$ when the input signal is at one side of the resonant frequency of the cavity resonator. It is apparent that reflected signal $E_8$ has been shifted in phase, by the action of the cavity resonator, relative to the phase of signal $E_9$ reflected from the short circuit in channel 9. The phase shift is due to the reactive nature of the impedance of one-entry resonator 11 presented to signals whose frequency departs from resonance. For signals on one side of resonance the reactance is inductive whereas for signals on the other side of resonance the reactance is capacitive. The short circuit in channel 9, in contrast, is a fixed termination and the phase of the signal reflected from that termination is the same (that is, the reflected voltage wave is 180° out of phase with incident voltage wave) regardless of the frequency of the incident signal.

The reflected signal $E_8$ in FIG. 4, entering the quadrature hybrid has been shifted in phase relative to the signal $E_9$ simultaneously entering the quadrature hybrid by an amount that is dependent upon the deviation of the input signal from the resonant frequency of the cavity resonator. Further, the direction of phase shift is entirely dependent upon whether the deviation of the input signal is above or below that resonant frequency.

The resultant signal $E_{10}$, emerging into channel 3, is seen to be smaller in amplitude than the resultant signal $E_{11}$ emerging into channel 4. The detection of those resultant signals by detectors 12 and 13 causes a D.C. signal to appear at output terminals 15, the polarity of the D.C. signal indicating the direction of the input signal's frequency deviation and the magnitude of the D.C. signal indicating the degree of frequency deviation.

Figure 5:
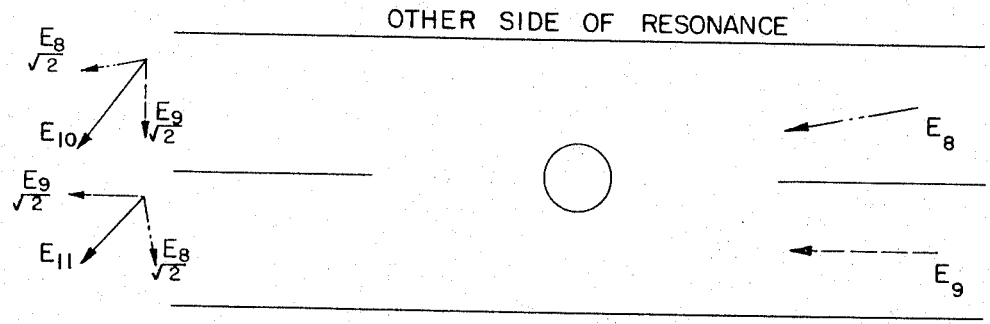
FIG. 5 is a vector diagram showing the relation of the reflected signals when the input signal is at the other side of resonance.

FIG. 5 for purposes of contrast, vectorially, depicts the changes in resultant signals $E_{10}$ and $E_{11}$ when the input signal is at the other side of resonance. It is evident in FIG. 5 that the phase of the reflected signal $E_8$ has been shifted, by the action of cavity resonator, in the opposite direction from that indicated in FIG. 4. In FIG. 5, the resultant signal $E_{11}$ is smaller than resultant signal $E_{10}$ and consequently the D.C. signal at output terminals 15 is of a different polarity than that obtaining for the conditions represented in FIG. 4.

When the frequency of the input signal is swept through the frequency range for which the apparatus is constructed, the output at terminals 15 is the familiar S-shaped discriminator curve.

FIG. 6 shows the scheme of an embodiment of the invention in which the wave energy passes through the quadrature hybrid but once. In contrast, in the FIG. 1 embodiment the wave energy twice passes through the quadrature hybrid coupler.

In the FIG. 6 embodiment, the signal whose deviation from a reference frequency is to be measured by the discriminator, is applied at the input port 20 of a hollow rectangular waveguide 21. The signal is transmitted through the waveguide to a dual directional coupler 22. The dual directional coupler is situated above waveguide channels 23 and 24 and a portion of the energy passing into the directional coupler is diverted through coupling apertures into channels 23 and 24. The greater part of the energy entering the directional coupler is undiverted and passes directly through to output port 25. The amount of energy coupled into channel 23 need not be equal to the amount of energy coupled into channel 24 although for purposes of initially balancing the discriminator it is preferred that the coupling to the two channels be identical.

The energy coupled into channel 23 proceeds toward a resonant cavity 26 that terminates channel 23 whereas the energy coupled into channel 24 proceeds toward a shorting plate 27 terminating channel 24 in a short circuit. Assuming the input signal $E_{20}$ applied at input port 20 is at the resonant frequency of cavity resonator 26, the signal incident on that cavity resonator is reflected in phase as from a short circuit. Where the frequency of the input signal $E_{20}$ is above or below resonance, the phase of the signal reflected from cavity 26 is affected by the cavity's reactance in a manner causing the phase of the reflected signal to be shifted in one direction at frequencies above resonance and shifted in the opposite direction for frequencies below resonance. The signal $E_{24}$ incident on the shorting plate is reflected from that termination in a manner such that the phase of the reflected signal is not affected by the frequency of the incident signal. It is apparent, therefore, that the phase of the reflected signal in channel 23 is frequency dependent whereas the phase of the reflected signal in channel 24 is independent of frequency.

The signal reflected by cavity resonator 26 and the signal reflected by short circuit 27 are directed into the input arms of a quadrature hybrid coupler 28. The hybrid coupler 28 is preferably of the "short slot" type described in the aforementioned U.S. patents. The path length $l_1$ from the resonator to the input arm of the hybrid coupler, preferably, is equal to the path $l_2$ from the short circuit to hybrid coupler other input arm. The reflected signal $E_{23}$ entering the hybrid coupler from channel 23 is divided by the quadrature hybrid coupler into two equal parts, one part entering channel 29 and the other part entering channel 30 with a 90° phase difference relative to the first part. The reflected $E_{24}$ signal entering the hybrid coupler from channel 24 is similarly split into two equal parts having a 90° phase difference. The resultant of the energies entering channel 29 and the resultant of the energies entering channel 30 proceed through channels 29 and 30 to detectors 31 and 32.

To initially balance the discriminator, a signal of the resonant frequency of resonator 26 is applied at input port 20 and the tap on potentiometer 33 is adjusted to obtain a null at output terminals 34.

FIG. 7 depicts an embodiment of the invention that is somewhat more compact than the embodiment of FIG. 6. In the FIG. 7 embodiment a cross-guide directional coupler 40 couples the input signal applied at port 41 to transmission channels 42 and 43. The coupling apertures 44 and 45 are each arranged on a diagonal and may be accompanied by subsidiary apertures in accordance with the exposition of U.S. Patent No. 2,870,419. The coupling apertures may be of slightly different sizes where it is desired to insure that equal amounts of energy are coupled into transmission channels 42 and 43. The energy coupled through aperture 44 is directed toward cavity resonator 46 which terminates channel 42 and energy coupled through aperture 45 is directed toward plate 47 which terminates channel 43 in a short circuit.

Energy reflected from the terminals in the transmission channels proceeds into the input arms of quadrature hybrid coupler 48. The path length $l_2$ from the short circuit to the input arm of the hybrid coupler is less than the path length $l_1$ from the resonator to the hybrid junction's other input arm. The difference between the lengths $l_1$ and $l_2$ is such that the path length of a resonant signal propagating from input port 41, through coupling aperture 44 to cavity 46, and thence, by reflection, along $l_1$ to the input arm of hybrid coupler 48 is equal to the path length that the same initial signal would follow in propagating from input port 41, through coupling aperture 45 to short circuit 47, and thence, by reflection, along $l_2$ to the other input arm of the quadrature hybrid coupler. Thus, an input signal, at the resonant frequency of cavity 46, applied at port 41 gives rise to signals in transmission channels 42 and 43 that are in phase when those signals enter the input arms of the quadrature hybrid coupler.

The signal reflected from cavity resonator 46 enters quadrature hybrid coupler 48 and is there divided into two equal parts, one part entering channel 49 and the other part entering channel 50 with a 90° phase difference relative to the first part. The signal reflected from short circuit 47 enters the quadrature hybrid coupler from channel 43 and is similarly split into two equal parts having a 90° phase difference. The resultant wave energy proceeding into channel 49 is detected by a detector 51 and the resultant wave energy proceeding into channel 50 is detected by a detector 52. The D.C. output of the detectors are effectively subtracted one from the other by applying those detectors' outputs, as shown in FIG. 7, to a potentiometer 53 having an adjustable tap connected to terminal 54.

As in the embodiment of FIG. 1, the phase of the signal reflected from the cavity resonators in the embodiments of FIGS. 6 and 7 is affected by the reactance of the resonator, causing the phase of the reflected signal to be shifted in one direction at frequencies above resonance and shifted in the other direction for frequencies below resonance. The vector diagrams appearing in FIGS. 3, 4, and 5, are, therefore, applicable also to the embodiments of FIGS. 6 and 7.

The operation of the invention has been described upon the premise that the cavity resonator, at resonance, reflects signals as though from a short circuit. It is known that the cavity resonator can be coupled to the transmission channel in a manner causing it to reflect signals, at resonance, as though from an open circuit. Consequently, the phase of the reflected wave, in a practical device, may be either that of a short or open circuit depending upon whether the cavity resonator is under-coupled or over-coupled to the transmission channel waveguide. The use of an "open circuit" cavity resonator in place of a "short circuit" cavity resonator does not alter the essential nature of the discriminator and is within the contemplation of this invention.

The embodiments illustrated in FIGS. 1, 6 and 7 are intended for employment in the frequency region where waveguide is commonly the medium utilized for wave transmission. For those frequencies where coaxial line is the medium commonly employed for wave transmission, the invention is embodied in apparatus of the coaxial type. Coaxial quadrature hybrids, coaxial directional couplers, coaxial line resonators, and coaxial transmission line straight-forwardly replace their waveguide equivalents. A strip line quadrature hybrid coupled such as is described by B. M. Oliver in his article entitled "Directional Electromagnetic Couplers," Proc. IRE, vol. 42, Nov. 1954, pp. 1682–1692 will serve in a coaxial line embodiment of the invention. The essential scheme of the invention, though embodied in coaxial apparatus, is unchanged.

While three embodiments of the invention are depicted in the drawings, it is apparent to those familiar with electronic apparatus that changes can be made which do not alter the nature of the invention. For example, strip transmission line devices may be employed in lieu of the illustrated waveguide embodiments. It is intended, therefore, that the invention not be restricted to the precise embodiments depicted, but rather that the scope of the invenion be construed in accordance with the appended claims.

What is claimed is:
1. A frequency discriminator comprising:
   means constituting a first transmission channel;
   a frequency sensitive wave energy reflector terminating one end of the first transmission channel, the wave energy reflector responding to changes in the frequency of an incident signal by causing the phase of the signal reflected from it to vary with changes in the frequency of the incident signal;
   means constituting a second transmission channel;
   a frequency insensitive wave energy reflector terminating one end of the second transmission channel, the wave energy reflector causing the phase of the signal reflected from it to be independent of changes in frequency of the incident signal;
   means for coupling the input signal applied to the discriminator into each channel in a manner causing the signal coupled into each channel to propagate toward the reflectively terminated end;
   a quadrature hybrid having two input arms and two output arms;
   the signal reflected from the reflectively terminated end of the first transmission channel being directed along a path of fixed length into one input arm of the quadrature hybrid;
   the signal reflected from the reflectively treminated end of the second transmission channel being directed along a path of fixed length into the other input arm of the quadrature hybrid;

the path length for the input signal which is directed by the coupling means to the reflectively terminated ends of the transmission channels and thence to the input arms of the quadrature hybrid being equal for both transmission channels whereby the reflected signals arrive simultaneously at the input arms;

and means for separately detecting the outputs from the two output arms of the quadrature hybrid.

2. A frequency discriminator comprising:

means constituting a first transmission channel;

a frequency sensitive wave energy reflector terminating one end of the first transmission channel, the wave energy reflector causing the phase of the reflected signal to be dependent upon the frequency of the incident signal;

means constituting a second transmission channel;

short circuiting means terminating one end of the second transmission channel;

means for simultaneously coupling an input signal to the first and second transmission channels to cause the signal in each channel to propagate toward the aforesaid terminated ends;

a quadrature hybrid;

the signal reflected from the reflective terminated end of the first transmission channel being directed along a path of fixed length into one arm of the quadrature hybrid;

the signal reflected from the short circuited end of the second transmission channel being directed along a path of fixed length into another arm of the quadrature hybrid;

the path length for the input signal traveling from the coupling means to the reflective terminations in each transmission channel and then to the respective input arms of the quadrature hybrid being identical for both transmission channels; and means for separately detecting the two outputs from the quadrature hybrid.

3. A frequency discriminator comprising:

means constituting a first transmission channel;

a resonant cavity coupled to and terminating one end of the first transmission channel;

means constituting a second transmission channel;

short circuiting means terminating one end of the second transmission channel;

means for concurrently coupling an input signal to the first and second transmission channels to cause the signal in each channel to propagate toward the aforesaid terminated end;

a quadrature hybrid;

the signal reflected from the resonant cavity terminated end of the first transmission channel being directed into one arm of the quadrature hybrid;

the signal reflected from the short circuited end of the second transmission channel being directed into another arm of the quadrature hybrid;

the path length for the input signal traveling from the coupling means to the reflective termination in a transmission channel and then to the input arm of the quadrature hybrid being identical for both transmission channels;

a pair of detectors; and means for applying the outputs from the quadrature hybrid to respective detectors.

4. A frequency discriminator comprising:

means constituting a first transmission channel;

a resonant cavity coupled to and terminating one end of the first transmission channel;

means constituting a second transmission channel;

means terminating one end of the second transmission channel in a short circuit;

coupling means for concurrently causing an input signal to propagate in each channel toward the aforesaid terminated end;

a quadrature hybrid having first and second input arms and first and second output arms;

the signal reflected from the resonant cavity being directed into the first input arm of the quadrature hybrid;

the signal reflected from the short circuited end of the second transmission channel being directed into the second input arm of the quadrature hybrid;

the path length for an input signal traveling from the coupling means to the reflective termination of a transmission channel and then to the input arm of the quadrature hybrid being identical for both transmission channels;

first and second detectors;

means for applying the output from the first output arm of the quadrature hybrid to the first detector; and means for applying the output from the second output arm of the quadrature hybrid to the second detector.

References Cited by the Examiner

UNITED STATES PATENTS

| 2,905,902 | 9/1959 | Strandberg | 329—116 X |
| 3,041,542 | 6/1962 | Bailey | 329—116 |
| 3,263,176 | 7/1966 | Riblet | 329—116 |

ROY LAKE, *Primary Examiner.*

A. L. BRODY, *Assistant Examiner.*